United States Patent
Adams et al.

(10) Patent No.: US 10,308,804 B2
(45) Date of Patent: Jun. 4, 2019

(54) UNSATURATED POLYESTER COMPOSITION FOR AUTOBODY REPAIR WITH IMPROVED ADHESION TO METAL SUBSTRATES

(71) Applicant: ILLINOIS TOOL WORKS INC., Glenview, IL (US)

(72) Inventors: Robert M. Adams, Cincinnati, OH (US); Helena Twardowska, Cincinnati, OH (US); Michael Schallick, Cincinnati, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/638,807

(22) Filed: Jun. 30, 2017

(65) Prior Publication Data
US 2018/0016435 A1    Jan. 18, 2018

Related U.S. Application Data

(60) Provisional application No. 62/363,019, filed on Jul. 15, 2016, provisional application No. 62/361,672, filed on Jul. 13, 2016.

(51) Int. Cl.

| | | |
|---|---|---|
| *C08L 67/07* | (2006.01) | |
| *C09D 7/40* | (2018.01) | |
| *C09D 5/34* | (2006.01) | |
| *C09D 167/06* | (2006.01) | |
| *C08K 7/22* | (2006.01) | |
| *C09D 167/07* | (2006.01) | |
| *C08L 67/06* | (2006.01) | |
| *C08K 5/00* | (2006.01) | |

(52) U.S. Cl.
CPC ............ *C08L 67/07* (2013.01); *C08K 5/0025* (2013.01); *C08K 7/22* (2013.01); *C08L 67/06* (2013.01); *C09D 5/34* (2013.01); *C09D 7/70* (2018.01); *C09D 167/06* (2013.01); *C09D 167/07* (2013.01); *C08L 2205/18* (2013.01)

(58) Field of Classification Search
CPC ...................................... C08L 67/07
See application file for complete search history.

(56) References Cited

U.S. PATENT DOCUMENTS

| | | | | |
|---|---|---|---|---|
| 3,993,798 A | * | 11/1976 | Brose | .................... C08F 283/01 427/500 |
| 5,028,456 A | * | 7/1991 | Naton | .................... C08L 67/06 427/140 |
| 6,268,464 B1 | | 7/2001 | Keinanen et al. | |

FOREIGN PATENT DOCUMENTS

| | | | |
|---|---|---|---|
| JP | S55142075 A | 11/1980 | |
| JP | H05148384 A | 6/1993 | |
| WO | 9519379 A1 | 7/1995 | |
| WO | WO-9519379 A1 | * 7/1995 | ........... C08G 63/553 |

OTHER PUBLICATIONS

International Search Report dated Sep. 28, 2017 for International Application No. PCT/US2017/041245 filed Jul. 7, 2017.

* cited by examiner

*Primary Examiner* — Vu A Nguyen
(74) *Attorney, Agent, or Firm* — Avery N. Goldstein; Blue Filament Law, PLLC

(57) ABSTRACT

A vehicle body repair formulation is provided that includes a polyester resin having a degree of unsaturation of between 25 and 100 molecule percent based on total acid and anhydride content. The polyester resin is dissolved or suspended in a monomer reactive diluent. Microspheroids are provided to enhance the sandability of a cured formulation. An initiator package is also provided. The reactive diluent/monomer can be chosen to be non-stryrenic to improve performance properties. A process for repairing a vehicle body is provided using ambient conditions alone or in combination with thermal source to aid in cure after applied to the vehicle body in need of repair.

17 Claims, No Drawings

UNSATURATED POLYESTER COMPOSITION FOR AUTOBODY REPAIR WITH IMPROVED ADHESION TO METAL SUBSTRATES

CROSS-REFERENCE TO RELATED APPLICATION

This application claims priority of U.S. Provisional Patent Application Ser. Nos. 62/361,672 and 62/363,019 filed Jul. 13, 2016 and Jul. 15, 2016, respectively; the contents of which are incorporated herein by reference.

FIELD OF THE INVENTION

The present invention in general relates to an unsaturated polyester composition and in particular, to such a polyester composition without resort to styrene monomer able to strongly adhere to metal substrates found on vehicle body panels and bumpers.

BACKGROUND OF THE INVENTION

Unsaturated polyester resins have been used in varied applications, such as in polyester vehicle body filler systems and glass reinforced polyester vehicle body filler systems used in the automotive body repair field. Galvanized (anti-corrosion) coatings inherently interfere with the interfacial cure and adhesion of all materials cured by free-radical polymerization, including polyester resin formulations. It has been known that polyester adhesion to metal can be improved by the use of adhesion promoters, the use of low molecular weight polymers with reduced monomer content, the use of metal pretreatments, or by accelerating the cross-linking reaction. Unfortunately, it has not been possible to achieve a highly flexible polymerized mastic that was both easily sandable and does not require the costly use of pre-treatments or adhesion promoters; the present invention overcomes this deficiency.

In the case of galvanized substrates, the poor adhesion problem is aggravated by the fact that the galvanize (zinc) retards curing of the resin system, delaying sanding and further operations on the filler, and, in some cases, may prevent a full cure. Additionally, as vehicle body constructs are increasingly made of lighter weight aluminum, high-strength steel, composite, and thermoplastic materials, vehicle body fillers need to be developed that can adhere to substrates with a broad range of surface energies.

Another dynamic in the automotive repair aftermarket industry is the increased regulatory concerns regarding the usage of styrene. Unsaturated polyester resin is a condensation product of dicarboxylic acids or anhydrides with di-, or poly-functional alcohols that traditionally have been dissolved in styrene as a reactive diluent. While unsaturated polyesters have been developed in the past as detailed for example in U.S. Pat. No. 6,268,464; these polyesters have been found unacceptable as vehicle body fillers owing to brittleness and excessive hardness.

Thus, there exists a need for a polyester resin that is capable of providing adhesion to metallic automotive body panels without resort to the use of pre-treatments or adhesion promoters. There still further exists a need for such a polyester resin formulation that is free of styrene.

SUMMARY OF THE INVENTION

A vehicle body repair formulation is provided that includes a polyester resin having a degree of unsaturation of between 25 and 100 molecule percent based on total acid and anhydride monomer content. The polyester resin is dissolved or suspended in a monomer reactive diluent. Microspheroids are provided to enhance the sandability of a cured formulation. A separately stored initiator package is also provided. The monomer can be chosen to be non-stryrenic to improve performance properties.

A process for repairing a vehicle body is provided that includes a polyester resin formulation part A that includes a polyester resin having a degree of unsaturation of between 25 and 100 molecule percent based on total acid and anhydride monomer content being mixed with a part B initiator package. At least one of the part A or said part B contains microspheres to form a curable mixture. The mixture is applied to a substrate of the vehicle body in need of repair. The mixture in contact with the substrate can be allowed to cure under ambient conditions (7 to 49° C.) or be exposed to a thermal source (37-82° C.) to promote the cure of the mixture. The mixture is cured to form a fill to repair the vehicle body.

DETAILED DESCRIPTION OF THE PREFERRED EMBODIMENTS

The present invention has utility as polyester resin that is able to bond to a galvanized steel substrate without resort to use of pre-treatments or adhesion promoters. A formulation of the polyester resin is also provided that contains no styrene monomer in the uncured formulation.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

One innovative aspect of the present invention is the degree of unsaturation of the polyester, which while traditionally would be excessively too reactive, creating a brittle matrix, with high shrinkage, poor adhesion and too hard for sanding by hand is surprisingly well suited for application to a galvanized steel substrate. In addition to adherence to a galvanized steel substrate, an invention polyester that provides desired properties when applied to other problematic substrates from an adhesion standpoint. These other substrates illustratively including stainless steel and aluminum. By selecting vinyl toluene as the sole reactive diluent, it was found that the dimensional stability was improved relative to styrene as a reactive diluent, the inventive polyester composition is rendered practical for the vehicle body repair industry and resulted in superior adhesion to metal substrates such as zinc-alloy and/zinc-aluminum-alloy panels, e-coated (pre-primed) steel, cold-rolled steel, and aluminum.

An inventive polyester resin formulation in certain embodiments includes a polyester resin that is fully reactive, with a non-styrenic molecule as the sole diluent. The polyester formulation is modified with specialized additives to control the free-radical polymerization so as to minimize exothermic heating and shrinkage. To further maximize the resulting cured polyester composite toughness and adhesion, in some inventive embodiments, a thermoplastic filler is also incorporated As used herein, "sandable" with reference of a cured inventive formulation is defined as having limited clogging of sandpaper and able to form a smooth and unbroken featheredge in less than 20 minutes at 25° C. with a 60 to 180 grit sandpaper. When external heat is applied, sanding can occur in less than 10 minutes.

As used herein, "non-brittle with reference of a cured inventive formulation is defined as not cracking or crazing from thermal expansion/contraction between 34 and 65 degrees Celsius over 20 cycles as measured by ASTM D6944-03 and ASTM D522-13.

An inventive polyester resin has a degree of ethylenic unsaturation that is between 25 and 100 molar percent of the dicarboxylic acids and anhydrides in the polyester resin and denotes reactivity within the polyester resin backbone to free radical polymerization. For purposes of calculating monomer percent, reactive diluents are omitted.

Suitable unsaturated acids or anhydrides used in the synthesis of embodiments of inventive polyester resins include maleic anhydride, maleic acid, fumaric acid, itaconic acid and related derivatives that retain the ethylenic unsaturation, and combinations of the aforementioned. These are present from 25 to 100 molar percent of the non-alcoholic monomer. In some inventive embodiments, from 50 to 100 monomer percent.

Saturated multifunctional carboxylic acids or anhydrides operative herein illustratively include phthalic acid, isophthalic acid, terephthalic acid, hexahydrophthalic acid, tetrahydrophthalic acid, cyclohexane dicarboxylic acid, adipic acid, succinic acid, malonic acid, nadic acid, trimellitic acid, pyromellitic acid, anhydrides of any of the aforementioned, and combinations thereof. Saturated monofunctional carboxylic acids operative herein in polyester resin formation according to the present invention illustratively include benzoic acid, 2-ethylhexanoic acid, lauric acid, and combinations thereof. In some inventive embodiments, the total saturated carboxylic acid and anhydride monomer content is 0 to 10 molar percent.

In some inventive embodiments, only maleic acid is present, resulting in 100% unsaturation. In still other embodiments, nadic acid and phthalic acid are used resulting in 50% unsaturation.

The dicarboxylic acid and anhydrides are reacted with any combination of monofunctional, bifunctional, or polyfunctional alcohols. Monofunctional alcohols operative herein illustratively include benzyl alcohol, 2-ethyl hexanol, lauryl alcohol, cyclohexanol, and combinations thereof. Bi- and multi-functional alcohols operative herein illustratively include ethylene glycol, diethylene glycol, triethylene glycol, propylene glycol, dipropylene glycol, tripropylene glycol, neopentyl glycol, butane diol, butyl ethyl propane diol, trimethylol propane, hexane diol, cyclohexane dimethanol, glycerol, pentaerythritol, polyether polyols, and combinations thereof. The amount of total alcohols in an inventive polyester resin range from about 100 to about 120 mole percent relative to the total carboxylic acid and anhydride content.

In some inventive embodiments, propylene glycol is used as the alcohol and in still other embodiments, propylene glycol is condensed with either maleic acid or a combination of nadic acid and phthalic acid are used resulting in 50% unsaturation. In still other inventive embodiments, propylene glycol and diethylene glycol are used in a molecular ratio of between 0.1-10:1 and in still other embodiments, propylene glycol and diethylene glycol are condensed with either maleic acid or a combination of nadic acid and phthalic acid are used resulting in 50% unsaturation. In still other embodiments, propylene glycol and diethylene glycol are condensed with monomers to form a polyester with hydroxyl and amine pendant functionality.

The unsaturation in a polyester backbone is reactive with vinyl and allyl moieties of a non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether. Typical amounts of terminally functionalizing molecules range from 1 to 3 molecular percent relative to the total carboxylic acid and anhydride monomer content.

An inventive unsaturated polyester is readily formed in a single or multi-stage reactions. Typical reaction temperatures range from 130-240° C. and in some embodiments in a range from 180 to 230° C. A conventional esterification catalyst is present and illustratively includes acids, transition metal catalysts and organo-tin compounds. Typical catalyst loadings range from 0.01 to 1 total weight percent of the reactants.

Reactive polyester resins used in a body filler formulation have a weight average molecular average weight ranging from 500 to 3000 and in still other embodiments from 1000 to 2000.

To form a body filler formulation, the resulting reactive polyester resin is dissolved in a non-styrenic reactive diluent. The non-styrenic diluent is present from 20 to 100 percent by weight relative to the unsaturated polyester.

Reactive diluents operative herein include acrylics, acrylates, and methacrylates such as methyl methacrylate, butyl acrylate, ethyl-hexyl acrylate, hydroxypropyl methacrylate, hydroxethyl methacrylate, lauryl acrylate, stearyl methacrylate, lauryl methacrylate, butanediol diacrylate, ethyleneglycol dimethacrylate, ethyleneglycol-DCPD methacrylate, ethyl(meth)acrylate and n- and isobutyl(meth)acrylate, cyclohexyl(meth)acrylate, isobornyl(meth)acrylate, benzyl (meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl ether; vinyl toluene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

In some embodiments, the reactive diluent is a non-styrenic aryl monomer. A non-styrenic aryl monomer is defined herein as any aromatic molecule with vinyl functionality. In particularly useful embodiments, the reactive diluent is vinyl toluene as this retains accelerated sanding times and properties of conventional formulations using styrene as the reactive diluent, with the added benefit of reducing the risk of environmental contamination and employee exposure to styrene.

Additives are present in an inventive unsaturated polyester formulation to improve at least one property of performance, storage stability, cure rate, sandability, or substrate adhesion. The additives illustratively include at least one of a thixotropic agent, a pigment, a dye, a suppressant, a filler, a promoter, an inhibitor, a leveling agent, or a wetting agent.

A thixotropic agent operative in the present invention illustratively includes fumed silica, organoclays, inorganic clays and precipitated silica. Multifunctional alcohols are commonly used to enhance thixotropic properties. A thixotropic agent is present from 0.1-3.0 percent by weight. The thixotropic agent is typically present from 0.5 to 2 total weight percent of a complete formulation for application to a substrate.

A pigment or dye operative in the present invention illustratively includes titanium dioxide, carbon black, iron oxides, phthalocyanine blue and other colorants. These pigments and dyes are amenable to dissolution or suspension in the reactive diluent. A pigment or dye is present from 0 to 10 total weight percent of a complete formulation for application to a substrate.

A suppressant reduces vapor emissions and in some embodiments enhances cure time. A suppressant operative in the present invention illustratively includes waxes, polyethers, polysiloxanes and various block copolymers. A suppressant is present from 0 to 5 total weight percent of a complete formulation for application to a substrate.

Fillers operative in the present invention illustratively include talc, mica, alumina trihydrate, calcium sulfate, calcium carbonate, magnesium sulfate, magnesium carbonate, barium sulfate, microspheres and the like. A filler is present from 0 to 70 percent of a complete formulation for application to a substrate.

As used herein a microsphere is defined to include a hollow microsphere having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microsphere typically has a longest linear dimension of between 20 and 150 microns to improve sandability and reduce density. A thermoplastic microspheroid is illustratively formed of acrylonitrile, polymethylmethacrylate (PMMA), phenolic resins, and waxes with melting points higher than precluding melting under formulation cure.

A leveling agent operative in the present invention illustratively includes acrylic resins, fluorocarbons, fluoropolymers and silicones. A leveling agent is present from 0 to 2 total weight percent of a complete formulation for application to a substrate.

A wetting agent operative in the present invention illustratively includes boric acid esters, phosphate esters, fatty acid salts, and polyethers. A wetting agent is present from 0 to 2 total weight percent of a complete formulation for application to a substrate.

A promotor is present to accelerate cure. Cure promotors operative herein include tertiary amines such as dimethyl analine (all analines) (DMAs), diethyl analine (DEA), dimethyl-para-toluidine (all toluidines) (DMPT), dihydroxy-para-toluidine (DHPT), monohydorxy-para-toluidine (MHPT), and combinations thereof. A cure promotor is present from 0.0005 to 1 total weight percent of a complete formulation for application to a substrate.

An inhibitor is present to extend shelf storage ability and extend cure time. Cure inhibitors operative herein illustratively include hydroquinone; parabenzoquinone; toluhydroquinone; a substituted quione such as NQ or TMHQ; 4-tert butylcatechol; and metal naphthenates. A cure inhibitor is present from 0.0005 to 1 total weight percent of a complete formulation for application to a substrate.

A resin formulation is typically stored as a part A that includes all components with the exception of an initiator package, and a part B containing a initiator package that is mixed with the part A immediately before application to the vehicle body substrate. A part B typically includes a peroxide, stabilizer, and a plasticizer. It is appreciated that other components with the exception of the polyester resin are also present in certain embodiments in the initiator package. As a result, the weight ratio of Part A:Part B is from to 1-100:1 or 1 to 4 total weight percent catalyst to total weight percent filler.

The resin compositions of the present invention cross-link with the reactive diluent by use of a number of free-radical initiators that include organic peroxide, azo-type initiators, electron beam, ultraviolet (UV) light, and combinations thereof. Peroxide initiators operative herein illustratively include diacylperoxides, hydroperoxides, ketone peroxides, peroxyesters, peroxyketals, dialkyl peroxides, alkyl peresters and percarbonates. Azo-type initiators operative herein illustratively include azobisisobutyronitrile (AIBN). Chemical initiators are typically present from 1 to 3 total weight percent of a fully mixed and applied polyester resin formulation. These resin compositions may optionally be cured by UV or electron beam.

In some inventive embodiments, after mixing of Parts A and B, and application to a substrate, the polyester resin formulation is subjected to heating to promote faster cure. By way of example, induction heating, infrared lamps, forced heated air, and combinations thereof are used to raise the temperature of the polyester resin formulation to a temperature of between 37 and 82° C.

Regardless of whether a given inventive polyester resin formulation is subjected to heating during cure, cure times are typically between 5 and 60 minutes, while in other inventive embodiments, the cure time is between 10 and 20 minutes. This range of cure times manifests as "dry to sand" (DTS) times of between 5 and 30 minutes. At DTS, the resulting filler has sufficient bond strength to substrate to render a "featheredge," meaning no tearing or chipping at the perimeter edge of the filler.

The present invention is further described with respect to the following non-limiting examples. These examples are intended to illustrate specific formulations according to the present invention and should not be construed as a limitation as to the scope of the present invention.

EXAMPLE 1

A first set of vehicle body fillers are produced that have the compositions as detailed in Table 1.

TABLE 1

Inventive vehicle body filler formulation, in which weight percentages are total weight percentages.

| Chemical | Weight % |
|---|---|
| Polyester Resin A: 100% unsaturated; all propylene glycol (PG) | 30.0-70.0 |
| Vinyl toluene (VT) | 2.0-10.0 |
| Microsphere A | 0.25-6.0 |
| Rheological: organoclay | 0-1.5 |
| Wetting agent: alkylammonium salt of an acidic copolymer | 0-2.0 |
| Promoter: tertiary amine | 0-3.0 |
| Metallic salt: copper naphthenate, 8% | 0-0.05 |
| Inhibitor 1: reacted benzoquinone | 0-0.06 |
| Inhibitor 2: reacted benzoquinone | 0-0.09 |
| Styrene suppressant: paraffin wax | 0-0.20 |
| Moisture scavenger: aliphatic anhydride | 0-2.0 |

TABLE 1-continued

Inventive vehicle body filler formulation, in which weight percentages are total weight percentages.

| Fillers/pigments | Remainder such as: |
|---|---|
| Pigment: TiO$_2$ | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

Appropriate resins are added into a mixing vessel and placed under a hi-torque mixer with a shear blade. Under slow rpm, any needed "additives", suppressants, and rheological additives are added slowly until uniformly dispersed. Mixer rpm is increased to approx. 2500 and blend is sheared for 3 minutes. Fillers are added one at a time and afterwards the entire mixture sheared for another 5 minutes. The shear blade is now replaced with a blending blade. Microspheres are then added and mixed under moderate rpm for 3 minutes. Mixture is then adjusted as needed to meet viscosity and gel time specifications.

EXAMPLE 2

A second set of vehicle body fillers are produced that have the compositions as detailed in Table 2.

TABLE 2

Inventive vehicle body filler formulation, in which weight percentages are total weight percentages.

| Chemical | Weight % |
|---|---|
| Polyester Resin A: 100% unsaturated; all PG | 30.0-70.0 |
| Polyester Resin D: 40% unsaturated; PG/diethylene glycol (DEG) | 10.0-20.0 |
| VT | 2.0-10.0 |
| Microsphere B | 0.25-6.0 |
| Rheological: organoclay | 0-1.5 |
| Wetting agent: alkylammonium salt of an acidic copolymer | 0-2.0 |
| Promoter: tertiary amine | 0.0-3.0 |
| Inhibitor: reacted benzoquinone | 0-0.09 |
| Suppressant: paraffin wax | 0-0.20 |
| Moisture scavenger: aliphatic anhydride | 0-2.0 |

| Fillers/pigments | Remainder such as: |
|---|---|
| Pigment: TiO$_2$ | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

Appropriate resins are added into a mixing vessel and placed under a hi-torque mixer with a shear blade. Under slow rpm, any needed "additives", suppressants, and rheological additives are added slowly until uniformly dispersed. Mixer rpm is increased to approx. 2500 and blend is sheared for 3 minutes. Fillers are added one at a time and afterwards the entire mixture sheared for another 5 minutes. The shear blade is now replaced with a blending blade. Microspheres are then added and mixed under moderate rpm for 3 minutes. Mixture is then adjusted as needed to meet viscosity and gel time specifications

EXAMPLE 3

Lap shear strengths of various embodiments of the inventive filler formulations are tested on various substrates in accordance with ASTM 1002-10. Lap shear measurements are taken at 20 minutes after catalyzation, which is the typical time for hand sanding, and correlates well to "featheredge", the time when a filler has sufficient adhesion to render a seamless edge without signs of chipping or delamination. To a body shop technician, this is the most critical part of the repair process because until this degree of strength of cure is achieved, sanding is not possible.

TABLE 3

Lap shear strength of Inventive vehicle body filler formulations on various substrates, as tested by ASTM 1002-10 for an Example 1 formulation relative to comparative conventional fillers 1-5.

| Substrate | Example 1 | | Filler 1 (RU) | | Filler 2 (ZG) | | Filler 3 (PPF) | | Filler 4 (N120) | | Filler 5 (K 120) | |
|---|---|---|---|---|---|---|---|---|---|---|---|---|
| | PSI | % CF | PSI | % CF | PSI | % CF | PSI | % CF | PSI | % CF | PSI | % CF |
| Resin Unsaturation | 100 | | 40 | | 32 | | 42 | | 45 | | 45 | |
| Cold rolled steel | 686 | 97 | 338 | 93 | 279 | 100 | 309 | 100 | 903 | 100 | 181 | 100 |
| Hot dipped galvanized 70 | 490 | 100 | 339 | 70 | 281 | 58 | 314 | 100 | 0 | 83 | 154 | 60 |
| Aluminum | 514 | 93 | 390 | 97 | 236 | 100 | 303 | 100 | 809 | 100 | 184 | 100 |
| E-coated steel, PPG | 621 | 100 | 550 | 100 | 347 | 100 | 596 | 100 | 836 | 60 | 142 | 0 |
| Solyl TPO | 88 | 0 | 53 | 0 | 77 | 0 | 63 | 0 | 49 | 0 | 42 | 0 |

EXAMPLE 4

The process of Example 3 is repeated with formulation of Example 2 having an overall degree of saturation of 79% through a blend of Resins A and D. The resulting formulation achieve adhesion results comparable to that of Example 1, as detailed in Table 3.

PROPERTIES RELATIVE TO COMPARATIVE EXAMPLES

The properties of the present invention are compared with prior art formulations as provided in Table 4.

TABLE 4

Comparison of inventive vehicle body repair formulations with prior art filler compositions.

| Reference: | Ex. 1A | Ex. 1B | Ex. 1C | Ex. 2A | Comp. Filler RG | Comp. Filler RG | Comp. Filler PGP |
|---|---|---|---|---|---|---|---|
| General Description | All VT | All (styrene) ST | High unsat., all VT | Mod unsat., all VT | Glass microsph all ST | Plastic microsph all ST | No microsph all ST |
| Benefit demonstrated | Better adhesion | | Better adhesion | | | Easier sanding, better adh. | |
| Polyester Resin A: High reactivity, all VT | 60.0 | | 60.0 | | | | |
| Polyester resin E: High reactivity, all ST | | 60.0 | | | | | |
| Polyester Resin D: Moderate reactivity, all VT | | | | 60.0 | | | |
| Polyester resin H: Low reactivity, all ST | | | | | 42.2 | 46.9 | 32.5 |
| Vinyl toluene | | | | | | | |
| Styrene | | | | | 3.93 | 1.70 | 303 |
| Rheological: organoclay | | | | | | 1.04 | |
| Wetting agent: alkylammonium salt of an acidic copolymer | 0.57 | 0.57 | 0.57 | 0.57 | 0.57 | 0.55 | 0.57 |
| Promoter: tertiary amine | 0.30 | 0.30 | 0.00 | 0.00 | 0.00 | 0.00 | 0.00 |
| Metallic salt: copper naphthenate, 8% | 0.036 | 0.036 | 0.00 | 0.00 | 0.00 | 0.00 | 0.00 |
| Inhibitor 1: reacted benzoquinone | 0.022 | 0.022 | 0.00 | 0.00 | 0.00 | 0.00 | 0.00 |
| Inhibitor 2: reacted benzoquinone | 0.020 | 0.04 | 0.020 | 0.00 | 0.02 | 0.00 | 0.00 |
| Suppressant: paraffin wax | 0.15 | 0.15 | 0.15 | 0.15 | 0.13 | 0.13 | 0.15 |
| Moisture scavenger: aliphatic anhydride | 0.58 | 0.58 | 0.58 | 0.58 | 1.08 | 1.04 | 0.96 |
| Pigment: $TiO_2$ | 1.04 | 1.04 | 1.04 | 1.04 | 0.49 | 0.47 | 7.86 |
| Calcium carbonate: 3.0 μm | 10.78 | 10.78 | 10.78 | 10.78 | 13.76 | 12.29 | 0.00 |
| Talc 1: 0.9 μm | 7.11 | 7.11 | 7.11 | 7.11 | 6.81 | 6.24 | 3.49 |
| Talc 2: 15.0 μm | 18.98 | 18.98 | 18.98 | 18.98 | 25.36 | 28.67 | 51.5 |
| Microsphere A | 0.8 | 0.8 | 0.8 | 0.8 | 0.00 | 0.70 | 0.00 |
| Microsphere B | | | | | 4.60 | 0.00 | 0.00 |
| Tensile lap shear, psi (ASTM D1002-13) | 530 | 334 | 530 | 641 | 760 | 986 | Not detm (nd) |
| % Cohesive failure | 100 | 100 | 100 | 55 | 100 | 100 | nd |
| Mandrel bend (ASTM D522-13) | Slight cracks | Slight cracks | Slight cracks | No cracks | nd | nd | nd |
| % Cohesive failure | 80 | 0 | 80 | 0 | nd | nd | nd |
| Sandability, % wt. loss (Struer's in-house test) | ~23-27 | ~20-23 | ~23-27 | ~30-37 | 23.42 | 27.45 | 13.21 |
| Dry to sand time, min | 45-50 | >90 | 14 | 21 | 22 | 17 | 20 |

As a person skilled in the art will recognize from the previous detailed description and from the figures and claims, modifications and changes can be made to the preferred embodiments of the invention without departing from the scope of this invention defined in the following claims.

The invention claimed is:

1. A vehicle body repair formulation comprising:
   a polyester resin having a degree of unsaturation of between 80 and 100 mole percent based on total acid and anhydride monomer content;
   a monomer reactive diluent in which said polyester resin is dissolved or suspended;
   thermoplastic microspheroids; and
   an initiator package.

2. The formulation of claim 1 wherein the degree of unsaturation is 100 mole percent.

3. The formulation of claim 1 wherein the total acid and anhydride content is only maleic acid.

4. The formulation of claim 1 wherein the total acid and anhydride content comprises at least two of nadic esters, nadic acid and phthalic acid.

5. The formulation of claim 1 wherein said monomer reactive diluent is a non-styrenic aryl monomer with vinyl functionality.

6. The formulation of claim 1 wherein said monomer reactive diluent comprises vinyl toluene.

7. The formulation of claim 1 wherein said monomer reactive diluent consists of only vinyl toluene.

8. The formulation of claim 1 wherein said monomer reactive diluent is one or more of: methyl methacrylate, butyl acrylate, ethyl-hexyl acrylate, hydroxypropyl methacrylate, hydroxyethyl methacrylate, lauryl acrylate, stearyl methacrylate, lauryl methacrylate, butanediol diacrylate, ethyleneglycol dimethacrylate, ethyleneglycol-DCPD methacrylate, ethyl(meth)acrylate, n- and isobutyl(meth)acrylate, cyclohexyl(meth)acrylate, isobornyl(meth)acrylate, benzyl(meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, DCPD diacrylate, ether monomers of the structure ($C_1$-$C_6$ alkyl)-O—($C_2$-$C_6$ alkylene), vinyl toluene, allyl substituted benzene, di-vinyl benzene, and di- and trifunctional acrylates.

9. The formulation of claim 1 wherein said microspheroids are from 20 to 150 microns in a longest linear dimension.

10. The formulation of claim 1 wherein said microspheroids are hollow.

11. The formulation of claim 1 wherein said microspheroids are present from 0.50 to 2.0 total weight percent.

12. A process for repairing a vehicle body comprising:
    mixing a polyester resin formulation part A comprising: a polyester resin having a degree of unsaturation of between 80 to 100 mole percent based on total acid and anhydride monomer content with a part B initiator package, at least one of said part A or said part B containing thermoplastic microspheroids to form a curable mixture;
    applying said mixture to a substrate of the vehicle body in need of repair;
    exposing said mixture to ambient conditions alone or in combination with a thermal source to promote cure of said mixture; and curing said mixture to form a fill to repair the vehicle body.

13. The process of claim 12 wherein said curing occurs within 60 minutes of forming said mixture.

14. The process of claim 12 further comprising sanding said fill.

15. The process of claim 14 wherein said sanding occurs within 30 minutes of forming said mixture.

16. The process of claim 12 wherein said thermal source is present and is an infrared lamp.

17. The process of claim 12 wherein said exposing raises a temperature of the mixture to a temperature of between 37 and 82° C.

* * * * *